United States Patent [19]

Shimabukuro

[11] Patent Number: 5,828,631
[45] Date of Patent: Oct. 27, 1998

[54] APPARATUS FOR REPRODUCING INFORMATION FROM A RECORDING MEDIUM USING TABLE OF CONTENTS INFORMATION STORED ON THE RECORDING MEDIUM

[75] Inventor: Chojun Shimabukuro, Atsugi, Japan

[73] Assignee: Victor Company of Japan, Ltd., Yokohama, Japan

[21] Appl. No.: 672,072

[22] Filed: Jun. 26, 1996

[30] Foreign Application Priority Data

Jun. 26, 1995 [JP] Japan ................................. 7-183337

[51] Int. Cl.⁶ .......................................................... G11B 7/00
[52] U.S. Cl. ............................................................... 369/32
[58] Field of Search ........................... 369/32, 58, 275.3, 369/47, 48, 275.4

[56] References Cited

U.S. PATENT DOCUMENTS

| | | | |
|---|---|---|---|
| 5,126,987 | 6/1992 | Shiba et al. | 369/32 |
| 5,153,861 | 10/1992 | Maeda et al. | 369/32 |
| 5,177,720 | 1/1993 | Kondo | 369/32 |
| 5,249,166 | 9/1993 | Hamilton et al. | 369/32 |
| 5,289,450 | 2/1994 | Mizumoto et al. | 369/58 |
| 5,313,443 | 5/1994 | Itsuka | 369/48 |
| 5,377,167 | 12/1994 | Maeda et al. | 369/32 |
| 5,408,478 | 4/1995 | Ohmori et al. | 369/54 |
| 5,430,698 | 7/1995 | Nonaka et al. | 369/32 |
| 5,537,387 | 7/1996 | Ando et al. | 369/275.3 |
| 5,546,365 | 8/1996 | Roth | 369/58 |
| 5,570,331 | 10/1996 | Akashi | 369/58 |
| 5,570,340 | 10/1996 | Lee et al. | 369/275.3 |
| 5,592,449 | 1/1997 | Goto et al. | 369/47 |
| 5,617,385 | 4/1997 | Lee et al. | 369/47 |
| 5,625,611 | 4/1997 | Yokota et al. | 369/47 |
| 5,634,031 | 5/1997 | Sakuma | 369/47 |
| 5,661,715 | 8/1997 | Blaukovitsch | 369/49 |
| 5,684,786 | 11/1997 | Schylander et al. | 369/275.3 |

Primary Examiner—Nabil Hindi
Attorney, Agent, or Firm—Pollock, Vande Sande & Priddy

[57] ABSTRACT

An information reproducing apparatus for recovering data stored on a recording disc. Table of contents (TOC) data is read from a recorded disc to define the tracks of program material on the recording disc in terms of absolute times which represent each track. A selected track may have a desired order number which is divided into sub tracks, represented by sub absolute times. When a portion of a track is to be read, a search for the sub track permits reproduction of the data on the track from a portion defined by the sub track.

1 Claim, 11 Drawing Sheets

FIG. 3

| | Address Control | TNO | Point | Min | Sec | Frame | Zero | ABSOLUTE TIME Min | Sec | Frame |
|---|---|---|---|---|---|---|---|---|---|---|
| | 01 | 00 | A2 | 04 | 00 | 01 | 00 | 38 | 15 | 13 |
| | 01 | 00 | A2 | 04 | 00 | 02 | 00 | 38 | 15 | 13 |
| TOC DATA | 01 | 00 | A2 | 04 | 00 | 03 | 00 | 38 | 15 | 13 |
| block | 01 | 00 | 01 | 04 | 00 | 04 | 00 | 00 | 02 | 37 |
| | 01 | 00 | 01 | 04 | 00 | 05 | 00 | 00 | 02 | 37 |
| | 01 | 00 | 01 | 04 | 00 | 06 | 00 | 00 | 02 | 37 |
| | 01 | 00 | 02 | 04 | 00 | 07 | 00 | 03 | 51 | 37 |
| | 01 | 00 | 02 | 04 | 00 | 08 | 00 | 03 | 51 | 37 |
| | 01 | 00 | 02 | 04 | 00 | 09 | 00 | 03 | 51 | 37 |
| | 01 | 00 | 03 | 04 | 00 | 10 | 00 | 08 | 05 | 72 |
| | 01 | 00 | 03 | 04 | 00 | 11 | 00 | 08 | 05 | 72 |
| | 01 | 00 | 03 | 04 | 00 | 12 | 00 | 08 | 05 | 72 |
| | 01 | 00 | 04 | 04 | 00 | 13 | 00 | 12 | 09 | 46 |
| | 01 | 00 | 04 | 04 | 00 | 14 | 00 | 12 | 09 | 46 |
| | 01 | 00 | 04 | 04 | 00 | 15 | 00 | 12 | 09 | 46 |
| | ↓ | ↓ | ↓ | | | ↓ | | | ↓ | |
| | 01 | 00 | 10 | 04 | 00 | 22 | 00 | 35 | 30 | 26 |
| | 01 | 00 | 10 | 04 | 00 | 23 | 00 | 35 | 30 | 26 |
| | 01 | 00 | 10 | 04 | 00 | 24 | 00 | 35 | 30 | 26 |
| | 01 | 00 | A0 | 04 | 00 | 25 | 00 | 01 | 00 | 00 |
| | 01 | 00 | A0 | 04 | 00 | 26 | 00 | 01 | 00 | 00 |
| | 01 | 00 | A0 | 04 | 00 | 27 | 00 | 01 | 00 | 00 |
| | 01 | 00 | A1 | 04 | 00 | 28 | 00 | 10 | 00 | 00 |
| | 01 | 00 | A1 | 04 | 00 | 29 | 00 | 10 | 00 | 00 |
| | 01 | 00 | A1 | 04 | 00 | 30 | 00 | 10 | 00 | 00 |
| | 01 | 00 | A2 | 04 | 00 | 31 | 00 | 38 | 15 | 13 |
| | 01 | 00 | A2 | 04 | 00 | 32 | 00 | 38 | 15 | 13 |
| | 01 | 00 | A2 | 04 | 00 | 33 | 00 | 38 | 15 | 13 |
| | 01 | 00 | 01 | 04 | 00 | 34 | 00 | 00 | 02 | 37 |
| | 01 | 00 | 01 | 04 | 00 | 35 | 00 | 00 | 02 | 37 |
| | | ↓ | ↓ | | | ↓ | | | ↓ | |

| | Address Contol | TNO | Point | Min | Sec | Frame | Zero | ABSOLUTE TIME Min | Sec | Frame | |
|---|---|---|---|---|---|---|---|---|---|---|---|
| | 41 | 00 | A2 | 04 | 00 | 01 | 00 | 69 | 53 | 13 | |
| | 41 | 00 | A2 | 04 | 00 | 02 | 00 | 69 | 53 | 13 | |
| TOC DATA | 41 | 00 | A2 | 04 | 00 | 03 | 00 | 69 | 53 | 13 | |
| block | 41 | 00 | 01 | 04 | 00 | 04 | 00 | 00 | 02 | 37 | |
| | 41 | 00 | 01 | 04 | 00 | 05 | 00 | 00 | 02 | 37 | |
| | 41 | 00 | 01 | 04 | 00 | 06 | 00 | 00 | 02 | 37 | |
| | 41 | 00 | 02 | 04 | 00 | 07 | 00 | 00 | 12 | 37 | |
| | 41 | 00 | 02 | 04 | 00 | 08 | 00 | 00 | 12 | 37 | |
| | 41 | 00 | 02 | 04 | 00 | 09 | 00 | 00 | 12 | 37 | |
| | ↓ | ↓ | ↓ | | ↓ | ↓ | | | ↓ | | |
| | 41 | 00 | A0 | 04 | 00 | 62 | 00 | 01 | 02 | 00 | |
| | 41 | 00 | A0 | 04 | 00 | 63 | 00 | 01 | 02 | 00 | 99A |
| | 41 | 00 | A0 | 04 | 00 | 64 | 00 | 01 | 02 | 00 | |
| | 41 | 00 | A1 | 04 | 00 | 65 | 00 | 00 | 12 | 00 | |
| | 41 | 00 | A1 | 04 | 00 | 66 | 00 | 00 | 12 | 00 | |
| | 41 | 00 | A1 | 04 | 00 | 67 | 00 | 00 | 12 | 00 | |
| | 41 | 00 | A2 | 04 | 00 | 68 | 00 | 69 | 53 | 13 | |
| | 41 | 00 | A2 | 04 | 00 | 69 | 00 | 69 | 53 | 13 | |
| | 41 | 00 | A2 | 04 | 00 | 70 | 00 | 69 | 53 | 13 | |
| | 41 | 00 | 01 | 04 | 00 | 71 | 00 | 00 | 12 | 37 | |
| | 41 | 00 | 01 | 04 | 00 | 72 | 00 | 00 | 12 | 37 | |
| | ↓ | | | | ↓ | | | | ↓ | | |

FIG. 6

| | | TNO | Point | Min | Sec | Frome | Zero | ABSOLUTE TIME | | |
|---|---|---|---|---|---|---|---|---|---|---|
| Address → Contol ↓ | | | | | | | | Min | Sec | Frome |
| | 41 | 00 | A2 | 04 | 00 | 01 | 00 | 66 | 45 | 13 |
| | 41 | 00 | A2 | 04 | 00 | 02 | 00 | 66 | 45 | 13 |
| TOC DATA | 41 | 00 | A2 | 04 | 00 | 03 | 00 | 66 | 45 | 13 |
| block | 41 | 00 | 01 | 04 | 00 | 04 | 00 | XX | XX | XX |
| | 41 | 00 | 01 | 04 | 00 | 05 | 00 | XX | XX | XX |
| | 41 | 00 | 01 | 04 | 00 | 06 | 00 | XX | XX | XX |
| | 41 | 00 | 02 | 04 | 00 | 07 | 00 | XX | XX | XX |
| | 41 | 00 | 02 | 04 | 00 | 08 | 00 | XX | XX | XX |
| | 41 | 00 | 02 | 04 | 00 | 09 | 00 | XX | XX | XX |
| | ↓ | ↓ | ↓ | | ↓ | ↓ | | | ↓ | |
| | 41 | 00 | A0 | 04 | 00 | 62 | 00 | 01 | 01 | 00 |
| | 41 | 00 | A0 | 04 | 00 | 63 | 00 | 01 | 01 | 00 | 99B
| | 41 | 00 | A0 | 04 | 00 | 64 | 00 | 01 | 01 | 00 |
| | 41 | 00 | A1 | 04 | 00 | 65 | 00 | 00 | 12 | 00 |
| | 41 | 00 | A1 | 04 | 00 | 66 | 00 | 00 | 12 | 00 |
| | 41 | 00 | A1 | 04 | 00 | 67 | 00 | 00 | 12 | 00 |
| | 41 | 00 | A2 | 04 | 00 | 68 | 00 | 66 | 45 | 13 |
| | 41 | 00 | A2 | 04 | 00 | 69 | 00 | 66 | 45 | 13 |
| | 41 | 00 | A2 | 04 | 00 | 70 | 00 | 66 | 45 | 13 |
| | 41 | 00 | 01 | 04 | 00 | 71 | 00 | 00 | 12 | 37 |
| | 41 | 00 | 01 | 04 | 00 | 72 | 00 | 00 | 12 | 37 |
| | ↓ | | | | ↓ | | | | ↓ | |

FIG. 8

| Y\X | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 10 | | | | | | | | | | | | | | | | |
| 11 | TN01 ABSOLUTE START TIME | | | | TN02 ABSOLUTE START TIME | | | | TN03 ABSOLUTE START TIME | | | | TN04 ABSOLUTE START TIME | | | |
| 12 | TN05 ABSOLUTE START TIME | | | | TN06 ABSOLUTE START TIME | | | | TN07 ABSOLUTE START TIME | | | | TN08 ABSOLUTE START TIME | | | |
| 13 | TN09 ABSOLUTE START TIME | | | | TN010 ABSOLUTE START TIME | | | | TN011 ABSOLUTE START TIME | | | | TN012 ABSOLUTE START TIME | | | |
| 14 | TN013 ABSOLUTE START TIME | | | | TN014 ABSOLUTE START TIME | | | | TN015 ABSOLUTE START TIME | | | | TN016 ABSOLUTE START TIME | | | |
| 15 | TN017 ABSOLUTE START TIME | | | | TN018 ABSOLUTE START TIME | | | | TN019 ABSOLUTE START TIME | | | | TN020 ABSOLUTE START TIME | | | |
| 16 | TN021 ABSOLUTE START TIME | | | | TN022 ABSOLUTE START TIME | | | | TN023 ABSOLUTE START TIME | | | | TN024 ABSOLUTE START TIME | | | |
| 17 | TN025 ABSOLUTE START TIME | | | | TN026 ABSOLUTE START TIME | | | | TN027 ABSOLUTE START TIME | | | | TN028 ABSOLUTE START TIME | | | |
| 18 | TN029 ABSOLUTE START TIME | | | | TN030 ABSOLUTE START TIME | | | | TN031 ABSOLUTE START TIME | | | | TN032 ABSOLUTE START TIME | | | |
| 19 | | | | | | | | | | | | | | | | |
| 1A | | | | | | | | | | | | | | | | |
| 1B | | | | | | | | | | | | | | | | |
| 1C | | | | | | | | | | | | | | | | |
| 1D | DISC TYPE | | | | | | | | | | | | | | | |
| 1E | | | | | | | | | | | | | | | | |
| 1F | | | | | | | | | | | | | | | | |

FIG. 9

| X/Y | 0123 Sec Min | 4567 Sec Min | 89AB Sec Min | CDEF Sec Min | TNo. |
|---|---|---|---|---|---|
| 11 | 2000 | 1530 | 5080 | 9021 | TNo. 1~4 |
| 12 | 4061 | 8591 | 7332 | 7362 | TNo. 5~8 |
| 13 | 8013 | 0353 | FFFF | FFFF | TNo. 9~12 |
| 14 | FFFF | FFFF | FFFF | FFFF | TNo. 13~16 |
| 15 | FFFF | FFFF | FFFF | FFFF | TNo. 17~20 |
| 16 | FFFF | FFFF | FFFF | FFFF | TNo. 21~24 |
| 17 | FFFF | FFFF | FFFF | FFFF | TNo. 25~28 |
| 18 | FFFF | FFFF | FFFF | FFFF | TNo. 29~32 |

FIG. 10

| X/Y | 0123 Sec Min | 4567 Sec Min | 89AB Sec Min | CDEF Sec Min | TNo. |
|---|---|---|---|---|---|
| 11 | 2000 | 2100 | 0030 | 0060 | TNo. 1~4 |
| 12 | 0090 | 0021 | 0051 | 0081 | TNo. 5~8 |
| 13 | 0012 | 0042 | 0072 | 0003 | TNo. 9~12 |
| 14 | 0033 | 0063 | 0093 | 0024 | TNo. 13~16 |
| 15 | 0054 | 0084 | 0015 | 0045 | TNo. 17~20 |
| 16 | 0075 | 0006 | 0036 | 0066 | TNo. 21~24 |
| 17 | 3596 | FFFF | FFFF | FFFF | TNo. 25~28 |
| 18 | FFFF | FFFF | FFFF | FFFF | TNo. 29~32 |

FIG. 11

| X/Y | 0123 | 4567 | 89AB | CDEF | |
|---|---|---|---|---|---|
| | Sec Min | Sec Min | Sec Min | Sec Min | TNo. |
| 11 | 2000 | 0400 | 0030 | 0060 | TNo. 1~4 |
| 12 | 0090 | 0021 | 0051 | 0081 | TNo. 5~8 |
| 13 | 0012 | 0042 | 0072 | 0003 | TNo. 9~12 |
| 14 | 0033 | 0063 | 0093 | 0024 | TNo. 13~16 |
| 15 | 0054 | 0084 | 0015 | 0045 | TNo. 17~20 |
| 16 | 0075 | 0006 | 0036 | 4566 | TNo. 21~24 |
| 17 | FFFF | FFFF | FFFF | FFFF | TNo. 25~28 |
| 18 | FFFF | FFFF | FFFF | FFFF | TNo. 29~32 |

APPARATUS FOR REPRODUCING INFORMATION FROM A RECORDING MEDIUM USING TABLE OF CONTENTS INFORMATION STORED ON THE RECORDING MEDIUM

BACKGROUND OF THE INVENTION

1. Field of the Invention

This invention relates to an apparatus for reproducing information from a recording medium such as a disc-shaped recording medium in the CD (compact disc) family.

2. Description of the Prior Art

The CD family includes a CD-DA (compact disc-digital audio), a CD-I FMV (compact disc- interactive full motion video), a video CD, and a DVD (digital video disc). The CD-DA exclusively records audio information. Each of the CD-I FMV, the video CD, and the DVD records compressed video information and compressed audio information.

An innermost part of a CD-DA has a lead-in area recording TOC (table of contents) data. A typical way of searching a CD-DA for a desired tune refers to TOC data. In the case of a CD-I FMV and a video CD, it is difficult to search for a desired moving-picture scene by referring to TOC data.

SUMMARY OF THE INVENTION

It is an object of this invention to provide an improved apparatus for reproducing information from a recording medium such as a disc-shaped recording medium in the CD (compact disc) family.

A first aspect of this invention provides an apparatus for reproducing information from a recording disc which comprises a memory; first means for reading TOC data from the recording disc and storing the TOC data into the memory, the TOC data including signals of order numbers of tracks and signals of absolute times corresponding to the order numbers of the tracks respectively; second means for designating a desired order number out of the order numbers of the tracks; third means for calculating a play time of information on the track having the desired order number designated by the second means in response to at least two of the absolute times; fourth means for deciding whether the play time calculated by the third means is equal to or longer than a given interval; fifth means for, in cases where the fourth means decides that the play time is equal to or longer than the given interval, substantially dividing the track having the desired order number into sub tracks and generating signals of the sub tracks; and sixth means for searching for a desired information piece on the track having the desired order number in response to at least one of the signals of the sub tracks which are generated by the fifth means.

A second aspect of this invention is based on the first aspect thereof, and provides an apparatus wherein the recording disc contains both audio information and moving-picture information.

A third aspect of this invention is based on the first aspect thereof, and provides an apparatus wherein the recording disc is either a recording disc exclusively containing audio information or a recording disc containing both audio information and moving-picture information.

A fourth aspect of this invention provides an apparatus for reproducing information from a recording disc which comprises a memory; first means for reading TOC data from the recording disc and storing the TOC data into the memory; second means for deciding whether or not the TOC data in the memory lacks signals of order numbers of tracks and signals of absolute times corresponding to the order numbers of the tracks respectively; third means for, in cases where the second means decides that the TOC data in the memory lacks signals of order numbers of tracks and signals of absolute times corresponding to the order numbers of the tracks respectively, assigning predetermined absolute times to the order numbers of the tracks respectively; and fourth means for searching for a desired information piece on the recording disc in response to at least one of the predetermined absolute times assigned to the order numbers of the tracks.

A fifth aspect of this invention provides an apparatus for reproducing information from a recording medium which comprises first means for reading TOC data from the recording medium, the TOC data including signals of first absolute start times corresponding to tracks on the recording medium respectively and also a signal of second absolute start time corresponding to a lead-out area of the recording medium; second means for setting sub absolute times between two adjacent absolute start times out of the first and second absolute start times; and third means for starting reproduction of main information from the recording medium in response to at least one of the sub absolute times set by the second means.

A sixth aspect of this invention provides an apparatus for reproducing information from a recording medium which comprises first means for reading TOC data from the recording medium, the TOC data including signals of first absolute start times corresponding to actual tracks on the recording medium respectively and also a signal of second absolute start time corresponding to a lead-out area of the recording medium; second means for setting sub absolute times between two adjacent absolute start times out of the first and second absolute start times; third means for assuming fictitious tracks on the recording medium; fourth means for assigning the sub absolute times to the fictitious tracks respectively; fifth means for designating a desired track out of the fictitious tracks; sixth means for detecting the sub absolute time assigned to the desired track designated by the fifth means; and seventh means for starting reproduction of main information from the recording medium in response to the sub absolute time detected by the sixth means.

A seventh aspect of this invention provides an apparatus for reproducing information from a recording medium which comprises first means for assigning predetermined absolute times to tracks on the recording medium respectively; second means for reading out a signal of start absolute time corresponding to a lead-out area of the recording medium; third means for setting sub absolute times between two adjacent absolute times out of the predetermined absolute times and the start absolute time; and fourth means for starting reproduction of main information from the recording medium in response to at least one of the sub absolute times set by the third means.

BRIEF DESCRIPTION OF THE DRAWINGS

FIG. 3 is a diagram of an example of the contents of data recorded on a TOC area of a CD-DA.

FIG. 5 is a diagram of an example of the contents of data recorded on a TOC area of a video CD.

FIG. 6 is a diagram of an example of the contents of data recorded on a TOC area of a CD-I FMV.

FIG. 8 is a diagram of a table format related to TOC data in a RAM in the apparatus of FIG. 7.

FIG. 9 is a diagram of a table format related to TOC data in the RAM in the apparatus of FIG. 7 in which a CD-DA is placed.

FIG. 10 is a diagram of a table format related to TOC data in the RAM in the apparatus of FIG. 7 in which a video CD is placed.

FIG. 11 is a diagram of a table format related to TOC data in the RAM in the apparatus of FIG. 7 in which a CD-I FMV is placed.

DESCRIPTION OF THE PREFERRED EMBODIMENTS

Figure 1:
FIG. 1 is a diagram of a part of a data stream recorded on a CD-DA.

A data stream recorded on a CD-DA (compact disc-digital audio) is divided into frames. As shown in FIG. 1, each frame has a sequence of a sync signal, subcode data, an audio information signal (a main information signal), and an error correction code signal. The subcode data includes Q channel data having 98 bits per 98 frames. The Q channel data represents various information pieces such as an information piece of absolute time, an information piece corresponding to a pause signal, and an information piece of a tune order number. The absolute time corresponds to the lapse of time or the interval of time since the start of a first track, that is, a track having an order number of "1".

Here, a track means a tune rather than a physical track on a CD-DA. Accordingly, a track order number means a tune order number. In the case of a CD-DA recording information of a plurality of tunes, a track having an order number of "1" means a first tune, and a track having an order number of "2" means a second tune, and so forth.

Figure 2:
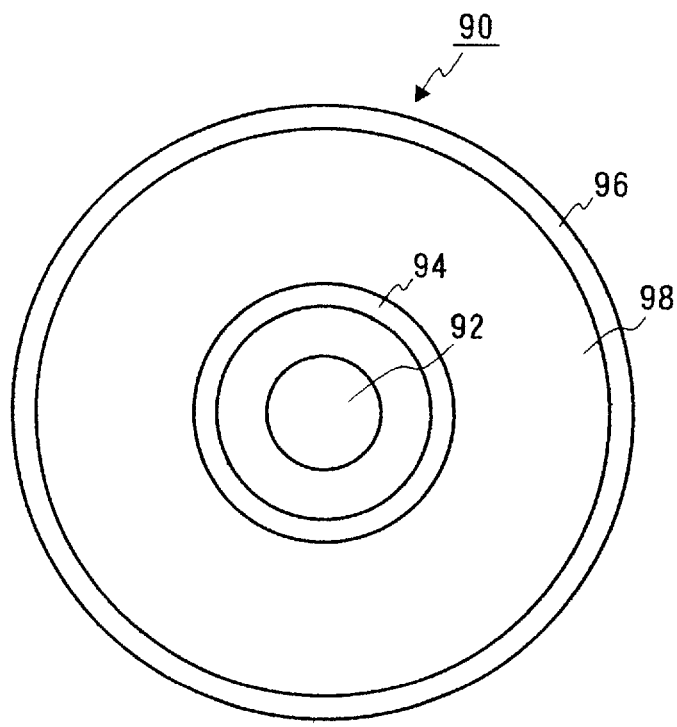
FIG. 2 is a plan view of a CD-DA.

As shown in FIG. 2, a CD-DA 90 has a center hole 92. An inner part of the CD-DA 90 has a lead-in area 94 while an outer edge of the CD-DA 90 has a lead-out area 96. The CD-DA 90 has a program region 98 extending between the lead-in area 94 and the lead-out area 96. The program region 98 stores main information representing tunes (also referred to as programs).

The lead-in area 94 has a TOC (table of contents) area which records TOC data or TOC information. The TOC data represents various information pieces such as an information piece of the total play time of all the recorded tunes, an information piece of absolute time corresponding to each track, and an information piece of the disc type.

The CD-DA 90 has a circumferentially-extending physical track for recording information. During the reproduction of information from the CD-DA 90, the physical track is scanned by an optical pickup head at a CLV (constant linear velocity).

FIG. 3 shows an example of the contents of information recorded on the TOC area of the CD-DA 90. In FIG. 3, each row of numerals and letters corresponds to a frame-corresponding data segment. With reference to FIG. 3, a control address has an information piece representing whether or not a recorded audio signal has undergone a pre-emphasis process, and also an information piece representing whether the recorded audio signal is of the stereophonic type or the monophonic type. For example, a control address of "01" indicates that a recorded audio signal has undergone a pre-emphasis process and is of the stereophonic type.

In FIG. 3, "TNo" denotes a recording area of the CD-DA 90 on which a related frame-corresponding data segment is recorded. For example, "TNo" being "00" denotes a lead-in area. Further, "Point" denotes an index such as a tune order number which can be used by a searching process. For example, "Point" being "A2" denotes a start position of a lead-out area while "Point" being "01", "02", "03", . . . , or "10" denotes a track order number. In addition, "Point" being "A0" denotes a tune order number corresponding to a first track, that is, a track having an order number of "1". Further, "Point" being "A1" denotes a tune order number corresponding to a final track, that is, a track having a maximum order number.

In FIG. 3, "Min", "Sec", and "Frame" following "Point" denote a position in the lead-in area on which a related frame-corresponding data segment is recorded. This position in the lead-in area is expressed in absolute time. Further, subsequent "Min", "Sec", and "Frame" compose "Absolute Time" which indicates the start position of each tune or the lead-out area. Specifically, "Absolute Time" represents a time interval between the start of a track having an order number of "1" and the start of each tune or the lead-out area, that is, the lapse of time (the interval of time) from the start of the first track to the start of each tune or the lead-out area.

Regarding the information recorded on the TOC area of the CD-DA 90, three successive frame-corresponding data segments are made equal in contents to compensate for disappearance of a portion of the recorded data which is caused by, for example, a scratch on the CD-DA 90. In FIG. 3, "Zero" denotes reserved data portions.

For example, a frame-corresponding data segment "01 (Control Address); 00 (TNo); A2 (Point); 04 00 01 (Min, Sec, Frame); 38 15 13 (Absolute Time)" represents that a recorded audio signal has undergone a pre-emphasis process and is of the stereophonic type. In addition, this frame-corresponding data segment is recorded in the lead-in area, and provides information of time of the start of a lead-out area which is measured from the start of the first track. Specifically, the recorded position of this frame-corresponding data segment in the lead-in area agrees with 4 minutes, 0 second, and 1 frame. The time of the start of the lead-out area is equal to 38 minutes, 15 seconds, and 13 frames from the start of the first track. The time of the start of the lead-out area corresponds to the total play time of all the tunes.

For example, a frame-corresponding data segment "01 (Control Address); 00 (TNo); 01 (Point); 04 00 04 (Min, Sec, Frame); 00 02 37 (Absolute Time)" represents that a recorded audio signal has undergone a pre-emphasis process and is of the stereophonic type. In addition, this frame-corresponding data segment is recorded in the lead-in area, and provides information of time of the start of a tune corresponding to the first track. Specifically, the recorded position of this frame-corresponding data segment in the lead-in area agrees with 4 minutes, 0 second, and 4 frames. The time of the start of the first-track tune is equal to 2 seconds and 37 frames from the start of the first track.

For example, a frame-corresponding data segment "01 (Control Address); 00 (TNo); A0 (Point); 04 00 26 (Min, Sec, Frame); 01 00 00 (Absolute Time)" represents that a recorded audio signal has undergone a pre-emphasis process and is of the stereophonic type. In addition, this frame-corresponding data segment is recorded in the lead-in area. Specifically, the recorded position of this frame-corresponding data segment in the lead-in area agrees with 4 minutes, 0 second, and 26 frames. Further, this frame-corresponding data segment represents that tunes start from the first track, and that the type of the present CD agrees with a CD-DA.

With reference to FIG. 3, a frame-corresponding data segment in which "Point" is "A0" is predetermined to represent the type of the present disc. Specifically, a place 99 in such a frame-corresponding data segment which extends at "Sec" in "Absolute Time" has an information piece of the type of the present disc. For example, the disc type information being "00" indicates that the present disc agrees with a CD-DA. The disc type information being "01" indicates that the present disc agrees with a CD-I FMV (compact disc-interactive full motion video). The disc type information being "02" indicates that the present disc agrees with a video CD.

A video CD records both compressed audio information and compressed moving-picture information. The standards for a video CD are determined in view of a compatibility with a CD-DA. Specifically, the standards for a video CD are placed on an extension of the standards fro a CD-DA. A video CD is similar in shape to a CD-DA. In addition, the recording format of data on a video CD is similar to the recording format of data on a CD-DA.

Figure 4:
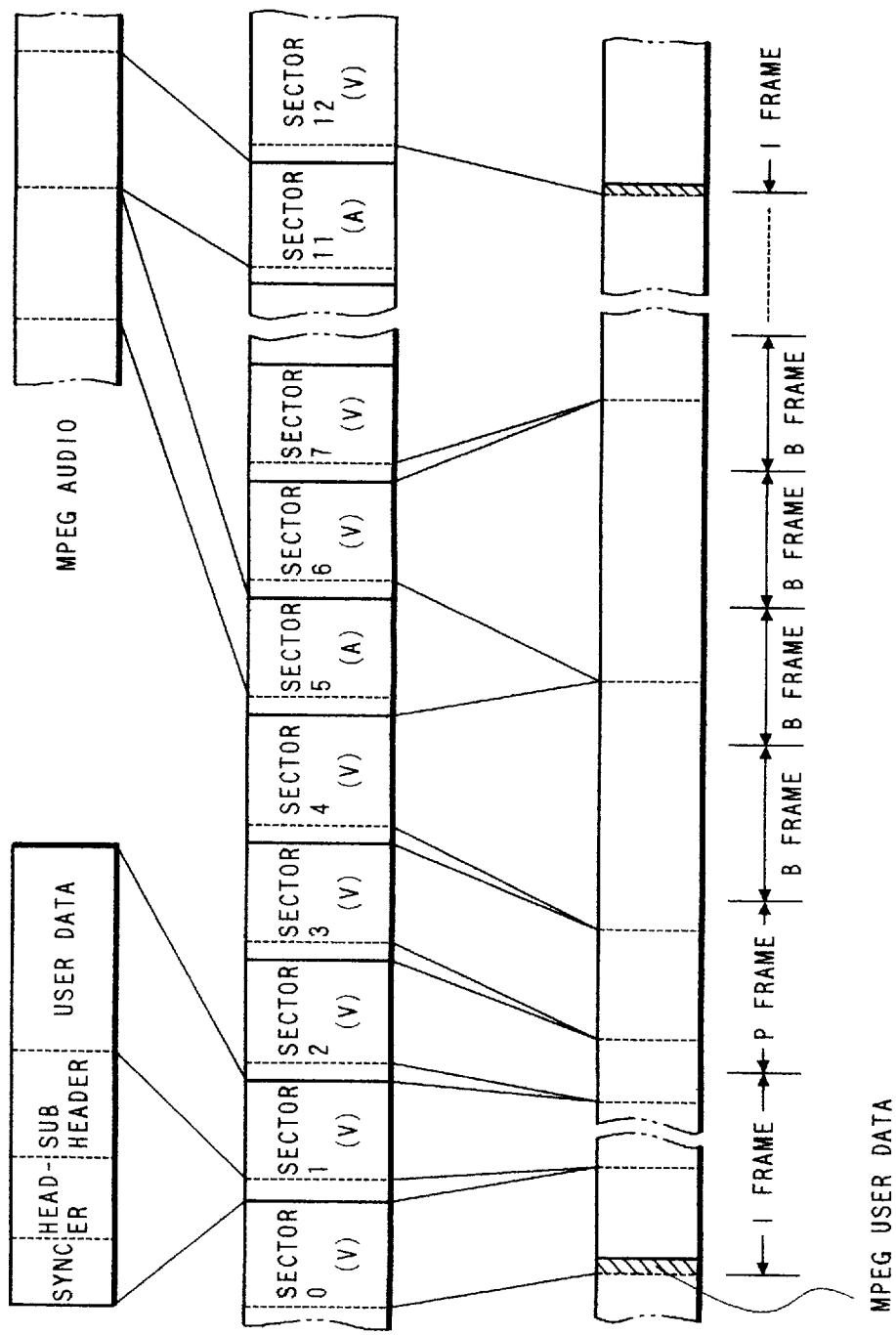
FIG. 4 is a diagram of a part of a data stream recorded on a video CD.

With reference to FIG. 4, a data stream recorded on a video CD is divided into sectors. Each sector has a sequence of a sync signal, header data, sub header data, and user data. Generally, user data in each sector represents either an interleaving-resultant moving-picture information piece "V" or an audio information piece "A". Moving-picture information and audio information represented by the data stream on the video CD are of the format which conforms to the MPEG1 (Moving Picture Expert Group 1) standards. In the data stream on the video CD, the mean ratio in the number of bits between the moving-picture information pieces "V" and the audio information pieces "A" is approximately equal to 5:1. The moving-picture information pieces "V" in the sectors compose a video data stream representing a sequence of picture frames including I picture frames (intra picture frames), P picture frames (predictive picture frames), and B picture frames (bi-directional predictive picture frames). Data representing each I picture frame results from an intra-frame encoding process. Data representing each P picture frame results from an inter-frame predictive encoding process. Data representing each B picture frame results from a bi-directional predictive encoding process. In a reproducing side, every image can be recovered on the basis of an I picture frame by referring to P picture frames and B picture frames.

The data stream on the video CD contains subcode data similarly to a data stream on a CD-DA. The subcode data includes Q channel data having 98 bits per sector. The Q channel data represents various information pieces such as an information piece of absolute time which is expressed in connection with a track order number. The absolute time corresponds to the lapse of time or the interval of time since the start of a first track, that is, a track having an order number of "1".

FIG. 5 shows an example of the contents of information recorded on a TOC area of a video CD. With reference to FIG. 5, a frame-corresponding data segment in which "Point" is "A0" is predetermined to represent the type of the present disc. A place 99A in such a frame-corresponding data segment which extends at "Sec" in "Absolute Time" has an information piece of the type of the present disc. For example, the disc type information being "02" indicates that the present disc agrees with a video CD.

In FIG. 5, a control address of "41" indicates that the present disc agrees with a data disc, and that the recording format of data on the present disc agrees with a mode 1. The TOC information in FIG. 5 represents that the present disc has only two tracks with order numbers of "1" and "2" respectively. Further, the TOC information in FIG. 5 represents that the lapse of time (the interval of time) to the start of a lead-out area corresponds to 69 minutes, 53 seconds, and 13 frames.

In a video CD, a track having an order number of "1" (the first track) records auxiliary information such as "karaoke" auxiliary information or video CD auxiliary information. On the other hand, the second and later tracks record main information including video information and audio information.

A CD-I FMV is an extension of a CD-I toward full motion video. The CD-I FMV records both compressed video data and compressed audio data of the format which conforms to the MPEG1 standards. In this regard, the CD-I FMV is similar to a video CD.

FIG. 6 shows an example of the contents of information recorded on a TOC area of a CD-I FMV. With reference to FIG. 6, a frame-corresponding data segment in which "Point" is "A0" is predetermined to represent the type of the present disc. A place 99B in such a frame-corresponding data segment which extends at "Sec" in "Absolute Time" has an information piece of the type of the present disc. For example, the disc type information being "01" indicates that the present disc agrees with a CD-I FMV.

In FIG. 6, a control address of "41" indicates that the present disc agrees with a data disc. The TOC information in FIG. 6 represents that tracks (first and second tracks) with order numbers of "1" and "2" have no recorded data. With reference to FIG. 6, each frame-corresponding data segment in which "Point" is "01" or "02" relates to the first track or the second track. In FIG. 6, a part of such a frame-corresponding data segment which is assigned to absolute time is expressed as "xx xx xx", and has no recorded information.

Figure 7:
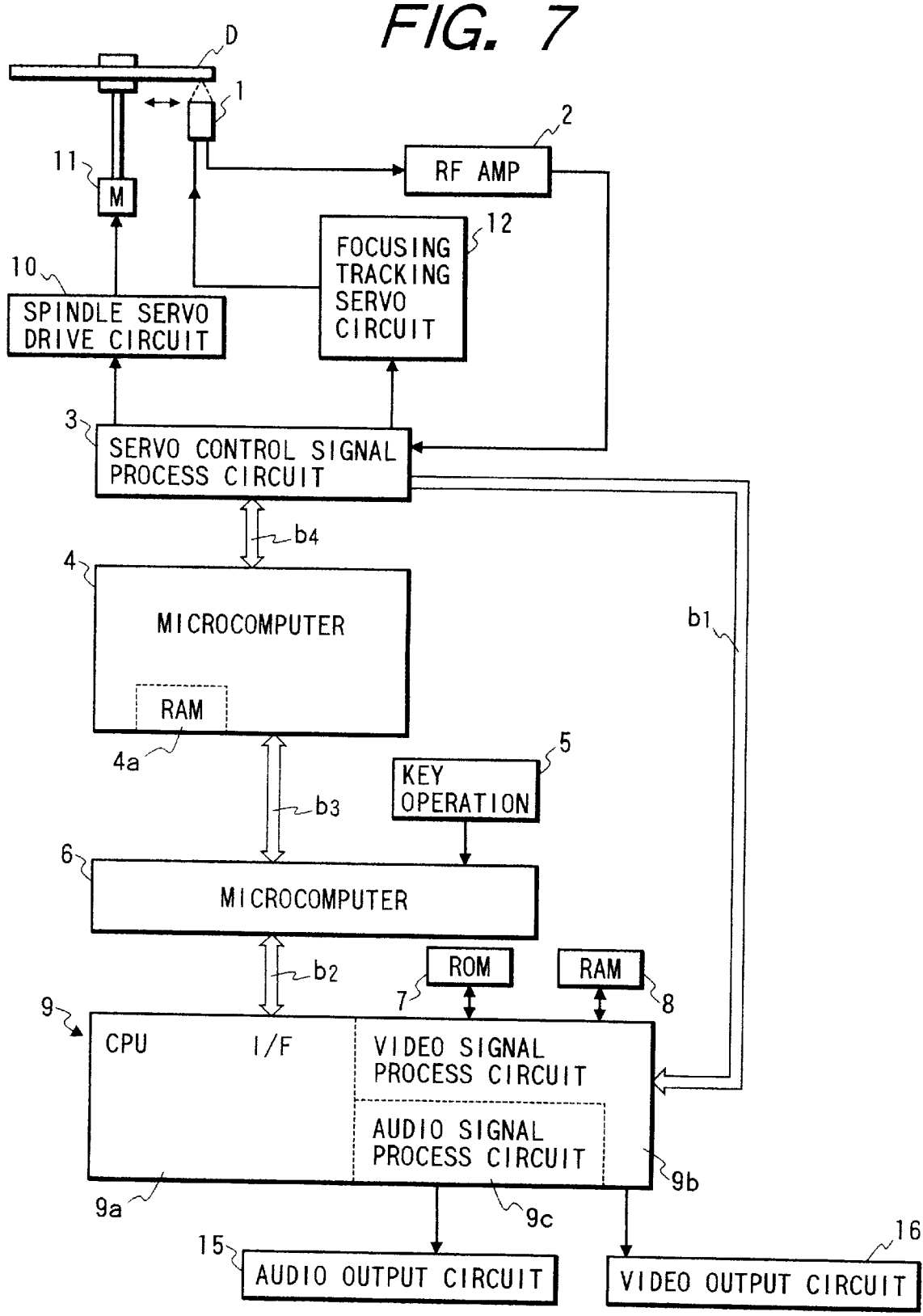
FIG. 7 is a diagram of an information reproducing apparatus according to a first embodiment of this invention.

FIG. 7 shows an information reproducing apparatus for optical discs including a CD-DA, a video CD, and a CD-I FMV. The information reproducing apparatus of FIG. 7 includes an optical pickup head 1 which scans an optical disc D to read out information therefrom. The optical pickup head 1 generates and outputs a reproduced signal representing the readout information. An RF amplifier 2 following the optical pickup head 1 receives the reproduced signal, and amplifies the reproduced signal.

A servo control and signal processing circuit 3 connected to the RF amplifier 2 receives an output signal therefrom which contains an EFM signal. The servo control and signal processing circuit 3 subjects the EFM signal to demodulation. The servo control and signal processing circuit 3 extracts subcode data from a demodulation-resultant signal, and also recovers compressed main data from the demodulation-resultant signal.

The servo control and signal processing circuit 3 is electrically connected via a spindle servo drive circuit 10 to a spindle motor 11. The optical disc D is rotated by the spindle motor 11. The servo control and signal processing circuit 3 controls rotation of the spindle motor 11 (that is, rotation of the optical disc D) via the spindle servo drive circuit 10.

The servo control and signal processing circuit 3 is electrically connected to the optical pickup head 1 via a focusing and tracking servo circuit 12. The servo control and signal processing circuit 3 controls the focusing and tracking servo circuit 12, thereby implementing the focusing control and the tracking control of the optical pickup head 1 with respect to the optical disc D.

A microcomputer 4 for the control of mechanical parts includes a combination of an input/output port, a CPU, a ROM, and a RAM. The microcomputer 4 operates in accordance with a control program stored in the ROM. The RAM within the microcomputer 4 includes a RAM 4a for storing data read out from a TOC area of the optical disc D (a CD-DA, a video CD, or a CD-I FMV). This TOC data (TOC-area information) is fed to the microcomputer 4 from the servo control and signal processing circuit 3 via a bus b4 extending between the devices 3 and 4. The microcomputer 4 accepts subcode data from the servo control and signal processing circuit 3. The microcomputer 4 implements the controlling function for a searching process in response to the TOC data in the RAM 4a.

The RAM 4a stores TOC-area information in a given table format such as shown in FIG. 8. With reference to FIG. 8, the RAM 4a is divided into a two-dimensional array of storage segments, each of which can be designed by an X-direction address and a Y-direction address. Each of the X-direction address and the Y-direction address is expressed in hexadecimal notation. Successive storage segments selected out of the storage segments of the RAM 4a are sequentially assigned to tracks respectively. Information pieces of absolute times corresponding to respective tracks and also an information piece of a disc type are stored in storage segments of the RAM 4a respectively.

In the case of a CD-DA, the RAM 4a stores TOC-area information in a manner such as shown in FIG. 9. In this case, a used table format is similar to that in FIG. 8. With reference to FIG. 9, a minute-corresponding part and a second-corresponding part of each absolute time are reversed. For example, absolute time "0353" corresponding to a final actual track having an order number of "10", that is, absolute time "0353" in a storage segment designed by an X address of "13" and a Y address of "4567", means 35 minutes and 30 seconds.

In the case of a video CD, TOC-area information is rewritten into a given format before being finally stored into the RAM 4a in a manner such as shown in FIG. 10. With reference to FIG. 10, a minute-corresponding part and a second-corresponding part of each absolute time are reversed. Further, a play time of a tune (or a program) corresponding to a final actual track is divided into equal intervals equal to, for example, 3 minutes. The boundaries among the division-resultant play time segments agree with actual time points equal to, for example, "3 minutes", "6 minutes", "9 minutes", . . . , and "66 minutes" respectively. Information pieces of the boundary time points are sequentially stored in storage segments of the RAM 4a which are assigned to fictitious tracks following the final actual track respectively. In FIG. 10, the final actual track agrees with the second track while the fictitious tracks correspond to the third to the twenty-fourth tracks. In this way, the information piece of the play time of the tune (or the program) corresponding to the final actual track is divided into added data pieces of the boundary time points which are sequentially written into the RAM storage segments assigned to the fictitious tracks following the final actual track respectively.

In other words, sub absolute times spaced at equal intervals are provided in the play time of the tune (or the program) corresponding to the final actual track. Further, fictitious tracks are assumed which follow the final actual track. Then, the sub absolute times are sequentially assigned to the fictitious tracks respectively. These processes correspond to the following fact. The final actual track is divided into sub tracks. Absolute times corresponding to the respective sub tracks are calculated on the basis of dividing the play time of the tune (or the program) corresponding to the final actual track.

With reference to FIG. 10, an information piece of absolute time corresponding to the lead-out area is stored in a storage segment of the RAM 4a which immediately follows the storage segment corresponding to the last fictitious track.

In the case of a CD-I FMV, TOC-area information is rewritten into a given format before being finally stored into the RAM 4a in a manner such as shown in FIG. 11. With reference to FIG. 11, a minute-corresponding part and a second-corresponding part of each absolute time are reversed. Further, a play time of a tune (or a program) corresponding to a final actual track is divided into equal intervals equal to, for example, 3 minutes. The boundaries among the division-resultant play time segments agree with actual time points equal to, for example, "3 minutes", "6 minutes", "9 minutes", . . . , and "63 minutes" respectively. Information pieces of the boundary time points are sequentially stored in storage segments of the RAM 4a which are assigned to fictitious tracks following the final actual track respectively. In FIG. 1 1, the final actual track agrees with the second track while the fictitious tracks correspond to the third to the twenty-third tracks. In this way, the information piece of the play time of the tune (or the program) corresponding to the final actual track is divided into added data pieces of the boundary time points which are sequentially written into the RAM storage segments assigned to the fictitious tracks following the final actual track respectively. In addition, an information piece of given absolute time equal to 0 minute and 2 seconds is stored in a storage segment of the RAM 4a which is assigned to a first track, that is, a track having an order number of "1". Further, an information piece of given absolute time equal to 0 minute and 40 seconds is stored in a storage segment of the RAM 4a which is assigned to a second track, that is, the final actual track or a track having an order number of "2".

With reference to FIG. 11, an information piece of absolute time corresponding to the lead-out area is stored in a storage segment of the RAM 4a which immediately follows the storage segment corresponding to the last fictitious track.

With reference back to FIG. 7, a microcomputer 6 for the apparatus main control includes a combination of an input/output port, a CPU, a ROM, and a RAM. The microcomputer 6 operates in accordance with a control program stored in the ROM. The microcomputer 6 is connected to the microcomputer 4 via a bus b3. The microcomputer 6 is connected to a key operation section 5. The key operation section 5 includes manually-operated keys and switches. The key operation section 5 generates input command information in accordance with operation of the keys and the switches therein. The microcomputer 6 receives the input command information from the key operation section 5. The microcomputer 6 controls the microcomputer 4 in response to the received input command information. The microcomputer 6 also implements the control of a compressed data processing circuit 9 which will be described later.

The compressed data processing circuit 9 includes a combination of an input/output port (an interface or an I/F), a CPU 9a, a video signal processing circuit 9b, an audio signal processing circuit 9c, a ROM 7, and a RAM 8. The compressed data processing circuit 9 operates in accordance with a control program stored in the ROM 7. The compressed data processing circuit 9 is connected to the servo control and signal processing circuit 3 via a bus b 1. The compressed data processing circuit 9 is connected to the microcomputer 6 via a bus b2. The video signal processing circuit 9b is connected to a video output circuit 16. The audio signal processing circuit 9c is connected to an audio output circuit 15.

The compressed data processing circuit 9 receives compressed main data from the servo control and signal processing circuit 3 via the bus b1, and processes the compressed main data into a digital video signal of a standard format and a digital audio signal of a standard format. Specifically, the video signal processing circuit 9b converts video information components of the compressed main data into the digital video signal of the standard format through a decoding process. The video signal processing circuit 9b feeds the digital video signal of the standard format to the video output circuit 16. On the other hand, the audio signal processing circuit 9c converts audio information components of the compressed main data into the digital audio signal of the standard format through a decoding process having a signal expanding step. The audio signal processing circuit 9c feeds the digital audio signal of the standard format to the audio output circuit 15.

The control program stored in the ROM 7 is designed to recover the video signal and the audio signal of the standard formats from the compressed main data. During the processing of the compressed main data by the compressed data processing circuit 9, the RAM 8 temporarily stores the compressed main data corresponding to compressed video data and compressed audio data.

The video output circuit 16 receives the digital video signal from the video signal processing circuit 9b. The video output circuit 16 encodes the received digital video signal into a corresponding video signal of the NTSC format or the PAL format.

The audio output circuit 15 receives the digital audio signal from the audio signal processing circuit 9c. The audio output circuit 15 converts the received digital audio signal into a left-channel analog audio signal and a right-channel analog audio signal while subjecting the received digital audio signal to a de-emphasis process.

The information reproducing apparatus of FIG. 7 operates as follows. In the case where an optical disc is placed in position within the information reproducing apparatus of FIG. 7 and a power supply switch in the key operation section 5 is changed to an ON position, the optical pickup head 1 is moved to a position opposing an inner part of the optical disc so that the optical pickup head 1 reads out information (TOC information or TOC data) from a TOC area of the optical disc. The TOC information is transmitted from the optical pickup head 1 to the microcomputer 4 via the RF amplifier 2, the servo control and signal processing circuit 3, and the bus b4 before being written into the RAM 4a. At this stage, the TOC data stored in the RAM 4a is of a given format such as shown in FIG. 8 or FIG. 9.

Figure 12:
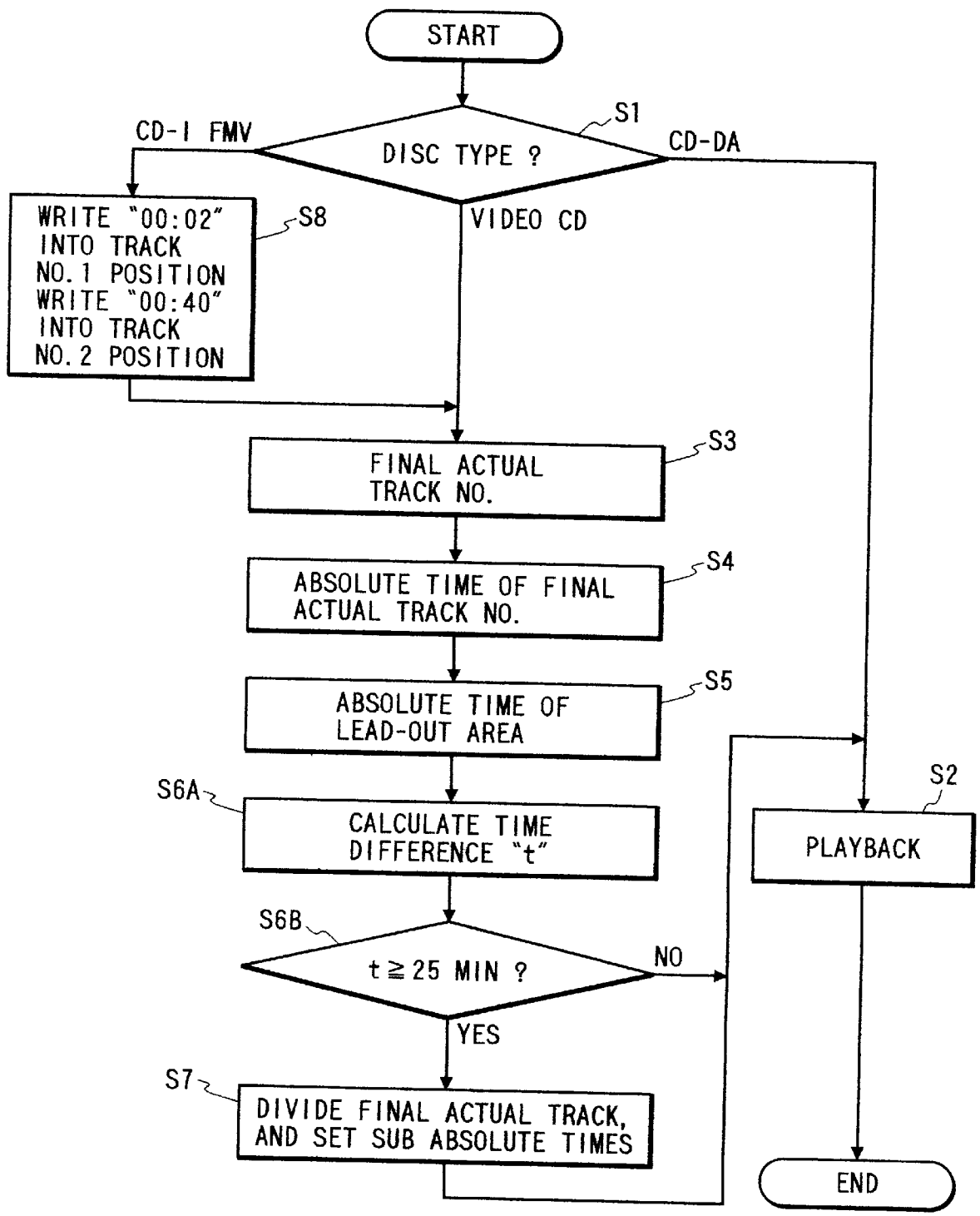
FIG. 12 is a flowchart of a segment of a control program for a microcomputer in the apparatus of FIG. 7.

When the key operation section 5 is actuated to select a play mode of operation of the information reproducing apparatus, a play-mode segment of the control program for the microcomputer 6 is started. FIG. 12 is a flowchart of the play-mode segment of the control program.

With reference to FIG. 12, a first step S1 of the program segment accesses the RAM 4a via the microcomputer 4, and reads out the disc type information in the TOC data from the RAM 4a. The step S1 decides whether the present optical disc agrees with a CD-DA, a CD-I FMV, or a video CD by referring to the disc type information. When the disc type information is "00", the present optical disc is found to be a CD-DA and the program advances from the step S1 to a block S2. When the disc type information is "01", the present optical disc is found to be a CD-I FMV and the program advances from the step S1 to a step S8. When the disc type information is "02", the present optical disc is found to be a video CD and the program advances from the step S1 to a step S3.

The step S3 accesses the RAM 4a via the microcomputer 4, and detects a final actual track (a final actually-used track) from the TOC data in the RAM 4a. For example, the final actual track is equal to a second track, that is, a track having an order number of "2". The step S3 stores a signal representative of the final actual track into the RAM within the microcomputer 6.

A step S4 following the step S3 accesses the RAM 4a via the microcomputer 4, and reads out a TOC information piece of absolute time corresponding to the final actual track from the RAM 4a. The absolute time corresponding to the final actual track is equal to, for example, 0 minute and 12 seconds (see FIG. 10). The step S4 stores the information piece of the absolute time corresponding to the final actual track into the RAM within the microcomputer 6.

A step S5 subsequent to the step S4 accesses the RAM 4a via the microcomputer 4, and reads out a TOC information piece of absolute time corresponding to the disc lead-out area from the RAM 4a. The absolute time corresponding to the disc lead-out area is equal to, for example, 69 minutes and 53 seconds (see FIG. 10). The step S5 stores the information piece of the absolute time corresponding to the disc lead-out area into the RAM within the microcomputer 6.

A step S6A following the step S5 subtracts the absolute time corresponding to the final actual track from the absolute time corresponding to the disc lead-out area. In other words, the step S6A calculates the difference "t" between the absolute time corresponding to the disc lead-out area and the absolute time corresponding to the final actual track. The calculated time difference "t" is equal to the play time of a tune (a program) related to the final actual track.

A step S6B subsequent to the step S6A compares the calculated time difference "t" with a given time interval equal to, for example, 25 minutes. When the time difference "t" is equal to or longer than the given time interval, the program advances from the step S6B to a step S7. On the other hand, when the time difference "t" is shorter than the given time interval, the program advances from the step S6B to the block S2.

The step S7 generates (1) various signals including: a signal representative of sub absolute time equal to the minute (2) part of the absolute time corresponding to the final actual track plus given minutes, a signal representative of sub absolute time equal to the minute part of the absolute time corresponding to the final actual track plus the given minutes multiplied by two (3), a signal representative of sub absolute time equal to the minute part of the absolute time corresponding to the final actual track plus the given minutes multiplied by three, . . . , and (4) a signal representative of sub absolute time equal to the minute part of the absolute time corresponding to the final actual track plus the given minutes multiplied by an integer but not greater than the absolute time corresponding to the disc lead-out area. The given time in minutes are equal to, for example, 3 minutes. The step S7 accesses the RAM 4a via the microcomputer 4, and sequentially stores the generated sub-absolute-time signals into storage segments of the RAM 4a which are assigned to tracks (fictitious tracks) following the final actual track. In addition, the step S7 stores the information piece of the absolute time corresponding to the disc lead-out area into a storage segment of the RAM 4a which immediately follows the storage segment related to the greatest sub absolute time. The information piece of the absolute time corresponding to the final actual tack and the information piece of the absolute time corresponding to each track preceding the final actual track remain stored in the assigned storage segments of the RAM 4a respectively. After the step S7, the program advances to the block S2.

In this way, the play time of a tune (a program) related to the final actual track is divided into partial play times which correspond to the sub absolute times respectively. Information pieces of the sub absolute times are stored into the RAM 4a as added data pieces. Specifically, the information pieces of the sub absolute times are sequentially stored into the storage segments of the RAM 4a which are assigned to the fictitious tracks. In other words, sub absolute times spaced at equal intervals are provided in the play time of the tune (or the program) corresponding to the final actual track. Further, fictitious tracks are assumed which follow the final actual track. Then, the sub absolute times are sequentially assigned to the fictitious tracks respectively. These processes correspond to the following fact. The final actual track is divided into sub tracks. Absolute times corresponding to the respective sub tracks are calculated on the basis of dividing the play time of the tune (or the program) corresponding to the final actual track.

The step S8 generates an information piece of given absolute time equal to 0 minute and 2 seconds. In addition, the step S8 generates an information piece of given absolute time equal to 0 minute and 40 seconds. The step S8 accesses the RAM 4a via the microcomputer 4, and stores the information piece of the given absolute time "0 minute and 2 seconds" into a storage segment of the RAM 4a which is assigned to a first track, that is, a track having an order number of "1". Further, the step S8 stores the information piece of the given absolute time "0 minute and 40 seconds" into a storage segment of the RAM 4a which is assigned to a second track, that is, a track having an order number of "2". After the step S8, the program advances to the step S3.

The block S2 corresponds to a playback routine. Specifically, the block S2 controls the microcomputer 4 and the compressed data processing circuit 9 to execute the reproduction of main information from the present optical disc and thereby to implement the playback of the main information. After the block S2, the current execution cycle of the program segment ends.

During the control of the microcomputer 4 by the block S2, the microcomputer 4 feeds control signals to the spindle servo drive circuit 10 and the focusing and tracking servo circuit 12 via the servo control and signal processing circuit 3, and thereby enables the rotation control of the present optical disc and the focusing and tracking control of the optical pickup head 1 with respect to the present optical disc. Generally, tracks on the present optical disc are sequentially traced by the optical pickup head 1. Thus, the optical pickup head 1 reads out main information from the present optical disc. The optical pickup head 1 generates and outputs an EFM signal representing the readout main information. The RF amplifier 2 receives the EFM signal from the optical pickup head 1, and amplifies the EFM signal. The RF amplifier 2 outputs the amplification-resultant EFM signal to the servo control and signal processing circuit 3.

The servo control and signal processing circuit 3 subjects the amplification-resultant EFM signal to a given demodulation process, thereby recovering the main information (main data) from the amplification-resultant EFM signal. The servo control and signal processing circuit 3 feeds the recovered main information (the recovered main data) to the compressed data processing circuit 9 via the bus b1.

In the case where the present optical disc agrees with a CD-DA, the recovered main information differs from compressed data. Accordingly, the recovered main information is transmitted to the audio output circuit 15 through the compressed data processing circuit 9 without being processed thereby. The audio output circuit 15 converts the recovered main information into a left-channel analog audio signal and a right-channel analog audio signal while subjecting the recovered main information to a de-emphasis process. The left-channel analog audio signal and the right-channel analog audio signal are applied to audio output terminals (not shown) respectively.

In the case where the present optical disc agrees with a video CD, the recovered main information is temporarily stored in the RAM 8. The recovered main information in the RAM 8 has compressed video data and compressed audio data. The compressed video data represents I picture frames, P picture frames, and B picture frames. The amount of the recovered main information in the RAM 8 is limited to about 20 sectors. Storing the recovered main information into the RAM 8 is intermittently executed. The compressed video data and the compressed audio data are fed from the RAM 8 to the video signal processing circuit 9b and the audio signal processing circuit 9c respectively. The video signal processing circuit 9b converts the compressed video data into a digital video signal of the standard format through a decoding process. The video signal processing circuit 9b feeds the digital video signal of the standard format to the video output circuit 16. On the other hand, the audio signal processing circuit 9c converts the compressed audio data into a digital audio signal of the standard format through a decoding process having a signal expanding step. The audio signal processing circuit 9c feeds the digital audio signal of the standard format to the audio output circuit 15. The CPU 9a continually monitors the amount of data in the RAM 8, and decides whether or not the amount of data in the RAM 8 falls below a given amount. When the amount of data in the RAM 8 falls below the given amount, the CPU 9a restarts storing the recovered main information into the RAM 8.

In the case where the present optical disc agrees with a CD-I FMV, the recovered main information is temporarily stored in the RAM 8. The recovered main information in the RAM 8 has compressed video data and compressed audio data. The compressed video data represents I picture frames, P picture frames, and B picture frames. The amount of the recovered main information in the RAM 8 is limited to about 20 sectors. Storing the recovered main information into the RAM 8 is intermittently executed. The compressed video data and the compressed audio data are fed from the RAM 8 to the video signal processing circuit 9b and the audio signal processing circuit 9c respectively. The video signal processing circuit 9b converts the compressed video data into a digital video signal of the standard format through a decoding process. The video signal processing circuit 9b feeds the digital video signal of the standard format to the video output circuit 16. On the other hand, the audio signal processing circuit 9c converts the compressed audio data into a digital audio signal of the standard format through a decoding process having a signal expanding step. The audio signal processing circuit 9c feeds the digital audio signal of the standard format to the audio output circuit 15. The CPU 9a continually monitors the amount of data in the RAM 8, and decides whether or not the amount of data in the RAM 8 falls below a given amount. When the amount of data in the RAM 8 falls below the given amount, the CPU 9a restarts storing the recovered main information into the RAM 8.

The block S2 in FIG. 12 includes a routine of selecting a desired tune or searching for a desired scene. This routine is referred to as the selecting/searching routine. The selecting/searching routine is started by an interruption process when command information of the order number of a desired track is inputted by actuating the keys in the key operation section 5.

During the execution of the selecting/searching routine, the microcomputer 6 transmits the command information of the desired track order number to the microcomputer 4. The microcomputer 4 accesses the RAM 4a in response to the command information of the desired track order number and reads, from the RAM 4a, an information piece of absolute time (start time) related to the desired track order number. The information piece of absolute time (start time) related to the desired track order number corresponds to a desired position of the optical pickup head 1 with respect to the present optical disc. The microcomputer 4 receives subcode data transmitted via the RF amplifier 2 and the servo control and signal processing circuit 3. The received subcode data represents an actual current position of the optical pickup head 1 with respect to the present optical disc. The microcomputer 4 calculates the difference between the desired position and the actual position of the optical pickup head 1, and generates a head control signal in response to the calculated difference. The microcomputer 4 feeds the head control signal to the focusing and tracking servo circuit 12 via the servo control and signal processing circuit 3. The focusing and tracking servo circuit 12 jumps the optical pickup head 1 to the desired position in response to the head control signal. In this way, when command information of the order number of a desired track is inputted by actuating the keys in the key operation section 5, the optical pickup head 1 is jumped to the start position of the desired track. Subsequently, the desired track and later tracks are sequentially traced by the optical pickup head 1 so that main information is sequentially reproduced from these tracks.

In the case where the present optical disc agrees with a CD-DA, one tune can be selected out of the tunes in the CD-DA as a desired tune, and the playback of the desired tune and subsequent tunes can be started by actuating the key operation section 5 to input command information of a track order number corresponding to the desired tune.

In the case where the present optical disc agrees with a video CD or a CD-I FMV, a play time of a tune (or a program) corresponding to a final actual track is divided into equal intervals equal to, for example, 3 minutes as previously described. Information pieces of the boundary time points (the sub absolute times) are sequentially stored in storage segments of the RAM 4a which are assigned to fictitious tracks following the final actual track respectively. Scenes in the final actual track which occur at the boundary time points (the sub absolute times) are used as search candidate scenes. The search candidate scenes correspond to the fictitious tracks respectively. One scene can be selected out of the search candidate scenes as a desired scene, and the playback of the desired scene and subsequent scenes can be started by actuating the key operation section 5 to input command information of a fictitious track order number corresponding to the desired scene.

Second Embodiment

A second embodiment of this invention is similar to the embodiment of FIGS. 1–12 except for design changes indicated hereinafter. The second embodiment of this invention uses a play-mode program segment in FIG. 13 instead of the play-mode program segment in FIG. 12.

Figure 13:
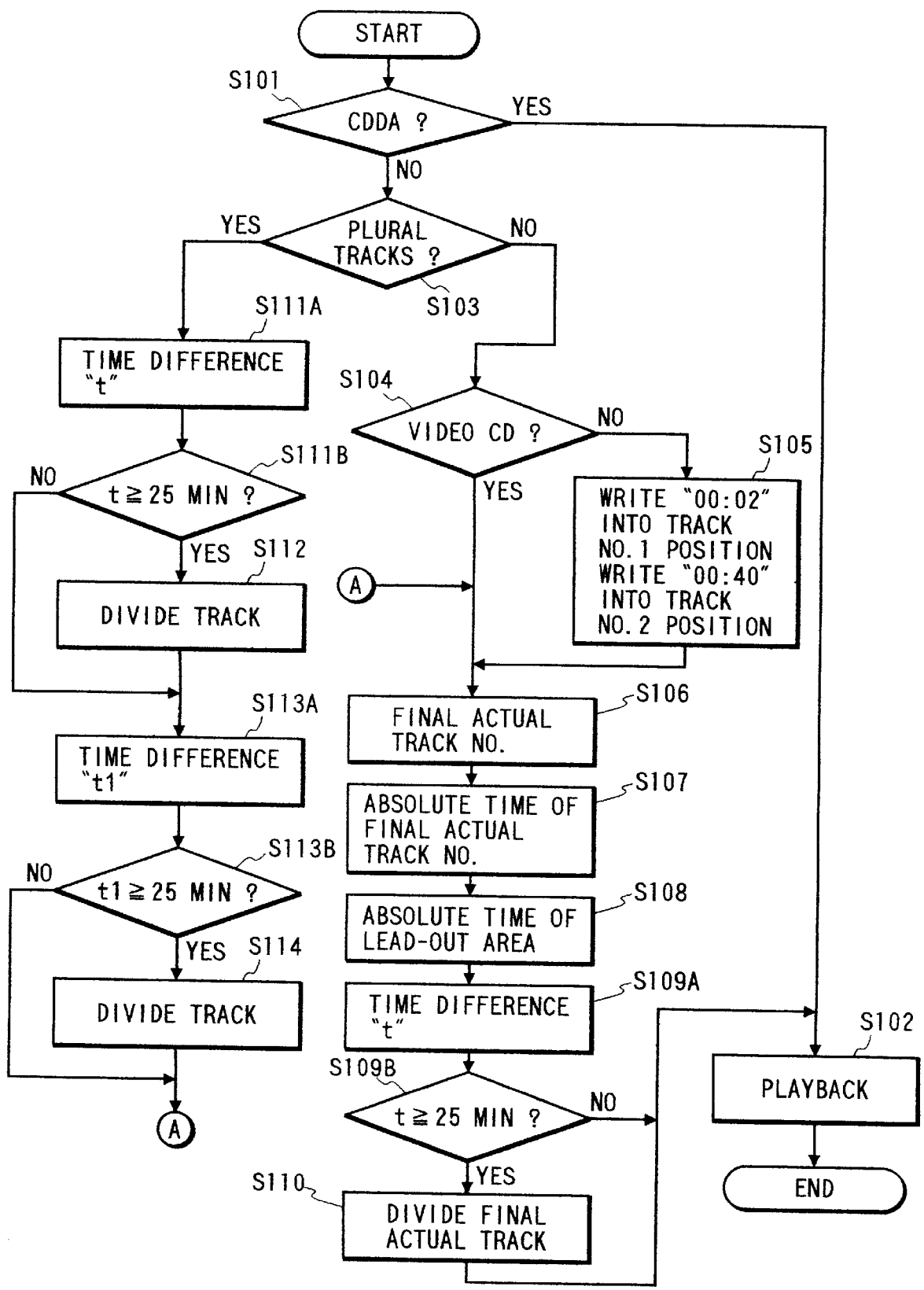
FIG. 13 is a flowchart of a segment of a control program for a microcomputer in an information reproducing apparatus according to a second embodiment of this invention.

With reference to FIG. 13, a first step S101 of the program segment accesses a RAM 4a (see FIG. 7) via a microcomputer 4 (see FIG. 7), and reads out disc type information in TOC data from the RAM 4a. The step S101 decides whether or not a present optical disc agrees with a CD-DA by referring to the disc type information. When the disc type information is "00", the present optical disc is found to be a CD-DA and the program advances from the step S101 to a block S102. When the disc type information is "01" or "02", the present optical disc is found to be a CD-I FMV or a video CD and the program advances from the step S101 to a step S103.

The step S103 accesses the RAM 4a via the microcomputer 4, and reads out the TOC data from the RAM 4a. The step S103 decides whether or not the present optical disc has plural tracks containing main information. The step S103 executes this decision by referring to the TOC data. When the present optical disc has plural tracks containing main information, the program advances from the step S103 to a step S111A. When the present optical disc does not have plural tracks containing main information, that is, when the present optical disc has only one track containing main information, the program advances from the step S103 to a step S104.

The step S104 decides whether or not the present optical disc agrees with a video CD by referring to the disc type information. When the disc type information is "02", the present optical disc is found to be a video CD and the program advances from the step S104 to a step S106. When the disc type information is "01", the present optical disc is found to be a CD-I FMV and the program advances from the step S104 to a step S105.

The step S106 accesses the RAM 4a via the microcomputer 4, and detects a final actual track (a final actually-used track) from the TOC data in the RAM 4a. The final actual track is equal to a second track, that is, a track having an order number of "2". The step S106 stores a signal representative of the final actual track into a RAM within a microcomputer 6 (see FIG. 7).

A step S107 following the step S106 accesses the RAM 4a via the microcomputer 4 and reads, from the RAM 4a, a TOC information piece of absolute time corresponding to the final actual track. The step S107 stores the information piece of the absolute time corresponding to the final actual track into the RAM within the microcomputer 6.

A step S108 subsequent to the step S107 accesses the RAM 4a via the microcomputer 4 and reads, from the RAM 4a, a TOC information piece of absolute time corresponding to the disc lead-out area. The step S108 stores the information piece of the absolute time corresponding to the disc lead-out area into the RAM within the microcomputer 6.

A step S109A following the step S108 subtracts the absolute time corresponding to the final actual track from the absolute time corresponding to the disc lead-out area. In other words, the step S109A calculates the difference "t" between the absolute time corresponding to the disc lead-out area and the absolute time corresponding to the final actual track. The calculated time difference "t" is equal to the play time of a tune (a program) related to the final actual track.

A step S109B subsequent to the step S109A compares the calculated time difference "t" with a given time interval. When the time difference "t" is equal to or longer than the given time interval, the program advances from the step S109B to a step S110. On the other hand, when the time difference "t" is shorter than the given time interval, the program advances from the step S109B to the block S102.

The step S110 generates a plurality of signals including: (1) a signal representative of sub absolute time equal to the minute part of the absolute time corresponding to the final actual track plus given minutes (2), a signal representative of sub absolute time equal to the minute part of the absolute time corresponding to the final actual track plus the given minutes multiplied by two (3), a signal representative of sub absolute time equal to the minute part of the absolute time corresponding to the final actual track plus the given minutes multiplied by three, . . . , and (4) a signal representative of sub absolute time equal to the minute part of the absolute time corresponding to the final actual track plus the given minutes multiplied by an integer but not greater than the absolute time corresponding to the disc lead-out area. The step S110 accesses the RAM 4a via the microcomputer 4, and sequentially stores the generated sub-absolute-time signals into storage segments of the RAM 4a which are assigned to tracks (fictitious tracks) following the final actual track. In addition, the step S110 stores the information piece of the absolute time corresponding to the disc lead-out area into a storage segment of the RAM 4a which immediately follows the storage segment related to the greatest sub absolute time. The information piece of the absolute time corresponding to the final actual track and the information piece of the absolute time corresponding to each track preceding the final actual track remain stored in the assigned storage segments of the RAM 4a respectively. After the step S110, the program advances to the block S102.

The step S105 generates an information piece of given absolute time equal to 0 minute and 2 seconds. In addition, the step S105 generates an information piece of given absolute time equal to 0 minute and 40 seconds. The step S105 accesses the RAM 4a via the microcomputer 4, and stores the information piece of the given absolute time "0 minute and 2 seconds" into a storage segment of the RAM 4a which is assigned to a first track, that is, a track having an order number of "1". Further, the step S105 stores the information piece of the given absolute time "0 minute and 40 seconds" into a storage segment of the RAM 4a which is assigned to a second track, that is, a track having an order number of "2". After the step S105, the program advances to the step S106.

The step S111A accesses the RAM 4a via the microcomputer 4 and reads, from the RAM 4a, a TOC information piece of absolute time corresponding to a second track, that is, a track having an order number of "2". In addition, the step S111A reads, from the RAM 4a, a TOC information piece of absolute time corresponding to a third track, that is, a track having an order number of "3". The step S111A subtracts the absolute time corresponding to the second track from the absolute time corresponding to the third track. In other words, the step S111A calculates the difference "t" between the absolute time corresponding to the second track and the absolute time corresponding to the third track. The calculated time difference "t" is equal to the play time of a tune (a program) related to the second track.

A step S111B subsequent to the step S111A compares the calculated time difference "t" with a given time interval equal to, for example, 25 minutes. When the time difference "t" is equal to or longer than the given time interval, the program advances from the step S111B to a step S112. On the other hand, when the time difference "t" is shorter than the given time interval, the program advances from the step S111B to a step S113A.

The step S112 generates a plurality of signals including: (1) a signal representative of sub absolute time equal to the minute part of the absolute time corresponding to the second track plus given minutes (2), a signal representative of sub absolute time equal to the minute part of the absolute time corresponding to the second track plus the given minutes multiplied by two (3), a signal representative of sub absolute time equal to the minute part of the absolute time corresponding to the second track plus the given minutes multiplied by three, . . . , and (4) a signal representative of sub absolute time equal to the minute part of the absolute time corresponding to the second track plus the given minutes multiplied by an integer but not greater than the absolute time corresponding to the third track. The number of the generated sub-absolute-time signals is limited to nine or less. The step S112 accesses the RAM 4a via the microcomputer 4, and sequentially stores the generated sub-absolute-time signals into storage segments of the RAM 4a which are assigned to tracks (fictitious tracks) having order numbers of "21", "22", "23", . . . After the step S112, the program advances to the step S113A.

The step S113A accesses the RAM 4a via the microcomputer 4 and reads, from the RAM 4a, a TOC information piece of absolute time corresponding to a fourth track, that is, a track having an order number of "4". The step S113A subtracts the absolute time corresponding to the third track from the absolute time corresponding to the fourth track. In other words, the step S113A calculates the difference "t1" between the absolute time corresponding to the third track and the absolute time corresponding to the fourth track. The calculated time difference "t1" is equal to the play time of a tune (a program) related to the third track.

A step S113B subsequent to the step S113A compares the calculated time difference "t1" with the given time interval (equal to, for example, 25 minutes). When the time difference "t1" is equal to or longer than the given time interval, the program advances from the step S113B to a step S114. On the other hand, when the time difference "t1" is shorter than the given time interval, the program advances from the step S113B to the step S106.

The step S114 generates a plurality of signals including: (1) a signal representative of sub absolute time equal to the minute part of the absolute time corresponding to the third track plus given minutes (2), a signal representative of sub absolute time equal to the minute part of the absolute time corresponding to the third track plus the given minutes multiplied by two (3), a signal representative of sub absolute time equal to the minute part of the absolute time corresponding to the third track plus the given minutes multiplied by three, . . . , and (4) a signal representative of sub absolute time equal to the minute part of the absolute time corresponding to the third track plus the given minutes multiplied by an integer but not greater than the absolute time corresponding to the fourth track. The number of the generated sub-absolute-time signals is limited to nine or less. The step S114 accesses the RAM 4a via the microcomputer 4, and sequentially stores the generated sub-absolute-time signals into storage segments of the RAM 4a which are assigned to tracks (fictitious tracks) having order numbers of "31", "32", "33", . . . After the step S114, the program advances to the step S106.

It should be noted that steps similar to the steps S113A, S113B, and S114 may be added in a place following the steps S113B and S114 to implement a time dividing process for each of the fourth track and later tracks.

The block S102 is similar to the block S2 in FIG. 12. The block S102 corresponds to a playback routine. Specifically, the block S102 controls the microcomputer 4 and a compressed data processing circuit 9 (see FIG. 7) to execute the reproduction of main information from the present optical disc and thereby to implement the playback of the main information. After the block S102, the current execution cycle of the program segment ends.

The block S102 includes a selecting/searching routine similarly to the block S2 in FIG. 12. The selecting/searching routine is started by an interruption process when command information of the order number of a desired track is inputted by actuating keys in a key operation section 5 (see FIG. 7).

In the case where the present optical disc agrees with a video CD or a CD-I FMV, a play time of each of long tunes (long programs) is divided into equal intervals as previously described. Information pieces of the boundary time points (the sub absolute times) are sequentially stored in storage segments of the RAM 4a which are assigned to fictitious tracks. Scenes in the long tunes which occur at the respective boundary time points (the sub absolute times) are used as search candidate scenes. The search candidate scenes correspond to the fictitious tracks respectively. One scene can be selected out of the search candidate scenes as a desired scene, and the playback of the desired scene and subsequent scenes can be started by actuating the key operation section 5 to input command information of a fictitious track order number corresponding to the desired scene.

What is claimed is:

1. An apparatus for reproducing information from a recording medium, comprising:

first means for reading TOC data from the recording medium, the TOC data including signals of first absolute start times corresponding to actual tracks on the recording medium respectively and also a signal of a second absolute start time corresponding to a lead-out area of the recording medium;

second means for setting sub absolute times between two adjacent absolute start times from the first and second absolute start times;

third means for assuming fictitious tracks on the recording medium;

fourth means for assigning the sub absolute times to the fictitious tracks respectively;

fifth means for designating a desired track out of the fictitious tracks;

sixth means for detecting the sub absolute time assigned to the desired track designated by the fifth means; and seventh means for starting reproduction of main information from the recording medium in response to the sub absolute time detected by the sixth means whereby reproduction begins in a location within a track represented by said sub absolute time.

* * * * *